Patented Jan. 31, 1950

2,496,097

UNITED STATES PATENT OFFICE 2,496,097

REACTION PRODUCTS OF AN ALDEHYDE AND A TRIAZINE DERIVATIVE

Edward L. Kropa, Old Greenwich, Conn., assignor to American Cyanamid Company, New York, N. Y., a corporation of Maine No Drawing. Application December 31, 1946,
Serial No. 719,632

20 Claims. (Cl. 260—67.6)

1

This application is a continuation-in-part of my copending application Serial No. 700,833, filed October 2, 1946.

This invention relates to the production of new synthetic materials and more particularly to new resinous compositions which are especially suitable for use in the plastics and coating arts. The invention specifically is concerned with compositions comprising a synthetic material which is the product of reaction of ingredients comprising (1) an aldehyde (including polymeric aldehydes, hydroxyaldehydes and aldehyde-addition products) and (2) a triazine derivative represented by the general formula I 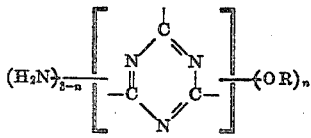

where $n$ represents an integer which is at least 1 and not more than 2, and R represents a monovalent radical which corresponds to the residue of a primary, ethylenically unsaturated monohydric alcohol containing at least 3 and not more than 10 carbon atoms (e. g., 2-amino-4,6-dialloxy-1,3,5-triazine, 2-alloxy-4,6-diamino-1,3,5-triazine, 2-amino-4,6-dimethalloxy-1,3,5-triazine, 2-methalloxy - 4,6 - diamino-1,3,5-triazine, etc.), including method features. The scope of the invention also includes heat-curable resinous compositions comprising a heat-convertible product obtained by effecting partial reaction between ingredients comprising an aldehyde, more particularly formaldehyde, and a triazine derivative represented by the general formula II 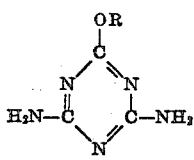

where R has the same meaning as given above with reference to Formula I, and products comprising the cured, more particularly heat-cured, compositions obtained therefrom.

Illustrative examples of monovalent radicals which R in Formulas I and II may represent are: allyl, 2-chloroallyl, 2-phenylallyl, methallyl, ethallyl, propallyl, 2-butenyl, 3-butenyl, 3-methyl-2-butenyl, 3-methyl-3-butenyl, 2-pentenyl, 3-pentenyl, 4-pentenyl, 2-methyl-2-pentenyl, 3-methyl-4-pentenyl, 2-hexenyl, 2-octenyl, 3-nonenyl, 2-decenyl, etc.

2

From the foregoing it will be seen that R can represent a polymerizable, monovalent, primary, monoethylenically unsaturated, aliphatic radical having at least 3 and not more than 10 carbon atoms and wherein the substituents attached to the carbon atoms of the aliphatic chain are selected from the class consisting of hydrogen, monochlorine and monovalent hydrocarbons, the ethylenic group being the sole unsaturated group in the said radical.

The triazine derivatives used in practicing the present invention are prepared, for example, by effecting reaction under alkaline conditions, which are maintained throughout the entire reaction period, and in the presence of an inorganic base, between (1) a triazine derivative represented by the general formula III 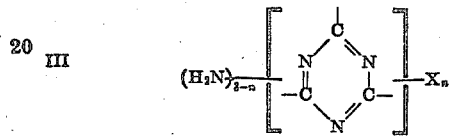

where $n$ has the same meaning as given above with reference to Formula I and X represents a halogen selected from the class consisting of chlorine and bromine, and (2) a primary, ethylenically unsaturated monohydric alcohol containing at least 3 and not more than 10 carbon atoms. The alcohol is employed in an amount corresponding to at least one mol thereof for each atom represented by X in Formula III. The unsaturated compound is then isolated from the resulting reaction mass. Reference is made to the copending application of James R. Dudley, Serial No. 700,840, filed October 2, 1946, for more detailed information concerning the preparation of a class of unsaturated esters which embraces the triazine derivatives employed in carrying the present invention into effect.

It is an object of the present invention to provide a new class of synthetic materials, more particularly resinous compositions, which have particular utility in the plastics and coating arts, e. g., as coating, laminating, adhesive, impregnating, casting and molding compositions, as well as in other applications.

Another object of the invention is to provide resinous compositions of the thermoplastic and thermosetting or potentially thermosetting types, which compositions reach their ultimate form by a combination of polymerization and condensation reactions.

Another object of the invention is to produce substantially insoluble, substantially infusible resinous products which are highly resistant to discoloration, e. g., upon aging for a prolonged period while exposed to light or under heat.

Another object of the invention is to provide new polymerizable compositions which, alone or admixed with other simple or resinous unsaturated compounds copolymerizable therewith, can be polymerized to yield new and valuable polymers and copolymers.

Another object of the invention is to provide casting and molding compositions which have considerably less "after-shrinkage" than the conventional casting and molding compositions containing resinous materials which become cured or thermoset solely by a condensation reaction.

Other objects of the invention will be apparent to those skilled in the art as the description of the invention proceeds.

The present invention is based on my discovery that new and valuable materials for use in coating, laminating (especially by low-pressure laminating technique), adhesive, molding and other applications can be prepared by effecting reaction between ingredients comprising an aldehyde, including polymeric aldehydes, hydroxyaldehydes and aldehyde-addition products (e. g., formaldehyde paraformaldehyde, aldol, dimethylol urea, trimethylol melamine, etc.) and a triazine derivative of the kind embraced by Formula I. By using such a triazine derivative, that is, one which contains both aldehyde-reactable amino groups and a polymerizable ester grouping, as a reactant with an aldehyde, e. g., formaldehyde, a condensation reaction between the triazine derivative and the aldehyde can be effected to yield a product which is capable of curing by polymerization of the unsaturated ester grouping. The monoamino triazines when reacted with an aldehyde can yield only simple derivatives by a condensation reaction whereas the diamino triazines can yield a resinous product by a condensation reaction alone.

Some of the condensation products of this invention are thermoplastic materials even at an advanced stage of condensation (e. g., those made from a triazine derivative containing a single amino grouping and a slowly polymerizable unsaturated ester grouping), while others are thermosetting or potentially thermosetting bodies that convert under heat or under heat and pressure to a substantially insoluble, substantially infusible state. The thermoplastic products are of particular value as plasticizers for other synthetic resins that have unsatisfactory plasticity or flow characteristics. The thermosetting or potentially thermosetting resinous materials, alone or mixed with fillers, pigments, dyes, plasticizers, lubricants, curing agents, etc., may be used, for example, in the production of molding compositions. The liquid intermediate reaction products of this invention may be concentrated or diluted further by the removal or addition of volatile solvents to form liquid coating, laminating and adhesive compositions of adjusted viscosity and concentration. The heat-convertible or potentially heat-convertible reaction products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable reaction products also may be used directly as casting resins, while those which are of a gel-like nature in partially reacted state may be dried and granulated to form clear, unfilled, heat-convertible resins.

The thermosetting or potentially thermosetting resins of this invention have considerable toughness in thermoset or cured state. This toughness can be varied as desired or as conditions may require, e. g., by varying the unsaturated ester grouping attached to the triazine nucleus. The new resins of my invention are characterized by their good color stability on aging for a prolonged period or under heat, a property that was entirely unobvious and in no way could have been predicted. In this respect they are markedly superior to resins similarly made from the corresponding sulfur analogues (e. g., 2-allylthio-4,6-diamino-1,3,5-triazine), which resins discolor under the same test conditions. The resins of the present invention therefore may be used advantageously in applications where color permanence is important. Because of their excellent electrical properties, e. g., high resistance to arcing, they are particularly suitable for use in various electrically insulating applications. The filled and unfilled resins also show less "after-shrinkage" than similar resins which cure solely by a condensation reaction.

In practicing my invention the initial condensation reaction between the reactants may be carried out at normal or at elevated temperatures, at atmospheric, subatmospheric or superatmospheric pressures, and under neutral, alkaline or acid conditions. Any substance yielding an alkaline or an acid aqueous solution may be used in obtaining alkaline or acid conditions for the initial condensation reaction. For example, I may use an alkaline substance such as sodium, potassium or calcium hydroxide, sodium or potassium carbonate, a mono-, di- or tri-amine, etc. Illustrative examples of acid condensation catalysts that may be employed are inorganic or organic acids, e. g., hydrochloric, sulfuric, phosphoric, acetic, lactic, acrylic, phthalic, maleic, etc., or acid salts such as sodium acid sulfate, monosodium phosphate, monosodium phthalate, etc. Mixtures of acids, of acid salts or of acids and of acid salts may be employed if desired.

Instead of effecting a condensation reaction between an aldehyde and the monomeric triazine derivative, I may first polymerize or partially polymerize the latter alone or admixed with other monomeric materials copolymerizable therewith, and then condense the resulting aldehyde-reactable polymer or copolymer, which may be a partial polymer or copolymer, with an aldehyde, e. g., formaldehyde.

Illustrative examples of monomeric materials that may be copolymerized with compounds of the kind embraced by Formula I are the reactive compounds which contain a $CH_2=C<$ grouping, more particularly a $CH_2=CH-CH_2-$ grouping, especially those which have a boiling point of at least about 60° C. Of the monomeric materials which may be used the allyl esters form a large class, all of which are suitable. The reactive allyl compounds which have been found to be most suitable are those having a high boiling point such as the diallyl esters, e. g., diallyl maleate, diallyl fumarate, diallyl phthalate and diallyl succinate. Other allyl compounds which are not necessarily high boiling also may be used.

More specific examples of allyl compounds that may be copolymerized with compounds of the kind embraced by Formula I and the resulting product thereafter reacted with an aldehyde are: allyl alcohol, methallyl alcohol, allyl acetate, allyl lactate, the allyl ester of alpha-hydroxyisobutyric acid, allyltrichlorosilane, allyl acrylate, allyl methacrylate, diallyl carbonate, diallyl malonate, diallyl oxalate, diallyl gluconate, diallyl methylgluconate, diallyl adipate, the diallyl ester of azelaic acid, diallyl sebacate, diallyl tartronate, diallyl tartrate, diallyl silicate, diallyl mesaconate, diallyl citraconate, diallyl glutaconate, the diallyl ester of muconic acid, diallyl itaconate, diallyl chlorophthalate, diallyldichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, hexaallyl disiloxane, etc.

Other examples of allyl compounds that may be employed are given, for example, in my aforementioned copending application Serial No. 700,-833 and in the applications referred to therein.

Examples of other monomeric materials which may be copolymerized with compounds of the kind embraced by Formula I and the resulting product thereafter reacted with an aldehyde, e. g., formaldehyde, are the unsaturated alcohol esters, e. g., the allyl, methallyl, crotyl, 1-chloroallyl, 2-chloroallyl, cinnamyl, vinyl, methvinyl, 1-phenylallyl, butenyl, propargyl, butynyl, etc., esters of saturated and unsaturated, aliphatic and aromatic, monobasic and polybasic acids such, for instance, as acetic, propionic, butyric, valeric, caproic, acrylic, alkacrylic (e. g., methacrylic, ethacrylic, etc.), crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, toluic, phenylacetic, phthalic, terephthalic, benzoylphthalic, etc., acids; the unsaturated monohydric alcohol esters, e. g., the methyl, ethyl, propyl, butyl, isobutyl, etc., esters of unsaturated aliphatic monobasic and polybasic acids, illustrative examples of which appear above; vinyl cyclic compounds, e. g., styrene, chlorostyrenes, dichlorostyrenes, methyl styrenes, dimethyl styrenes, vinyl naphthalene, vinyl cyclohexane, vinyl furane, vinyldibenzofuran, divinyl benzene, etc.; unsaturated ethers, e. g., ethyl vinyl ether, diallyl ether, methallyl ethyl ether, etc.; unsaturated amides, for instance, N-allyl caprolactam, acrylamide and N-substituted acrylamides, e. g., N-methylol acrylamide, N-methyl acrylamide, N-allyl acrylamide, etc.; unsaturated ketones, e. g., methyl vinyl ketone, divinyl ketone, methyl allyl ketone, etc.; methylene malonic esters, e. g., methylene methyl malonate, etc.; butadienes, e. g., 1,3-butadiene, 2-chlorobutadiene; unsaturated polyhydric alcohol (e. g., butenediol, butynediol, etc.) esters of saturated and unsaturated, aliphatic and aromatic, monobasic and polybasic acids, illustrative examples of which appear above.

Instead of using a compound containing a $CH_2=C<$ grouping for copolymerization with a compound of the kind embraced by Formula I, I may employ other polymerizable materials, e. g., resins possessing a plurality of polymerizably reactive alpha,beta-enal groups, that is, the grouping

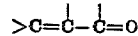

and which are herein designated as "unsaturated alkyd resins." Such resins are produced, for example, by the esterification of an unsaturated alpha, beta-polycarboxylic acid of the aliphatic series, more particularly an alpha,beta-unsaturated polycarboxylic acid, with a polyhydric alcohol, e. g., a glycol. The term "acid" and more specifically "polycarboxylic acid" as used herein includes within its meaning the anhydride thereof if available. The unsaturated alkyd resin is preferably one having an acid number not greater than 50, although in some cases resins having an acid number as high as 100 may be employed. The term "unsaturated alkyd resin" as used herein does not include within its meaning the conventional drying oil acid-modified alkyd resins in the preparation of which an aromatic or saturated aliphatic polycarboxylic acid or anhydride is employed.

Illustrative examples of unsaturated alkyd resins that may be used are those produced by reaction of the following ingredients: ethylene glycol and maleic anhydride; glycerine and maleic anhydride; diethylene glycol, maleic anhydride and phthalic anhydride; diethylene glycol and itaconic acid; ethylene glycol, maleic anhydride and succinic acid; ethylene glycol, itaconic acid and phthalic anhydride; diethylene glycol, maleic anhydride and tung oil acids; ethylene glycol, maleic anhydride, linseed oil acids and phthalic anhydride; diethylene glycol and maleic anhydride; ethylene glycol, maleic anhydride and stearic acid; diethylene glycol, maleic anhydride and decyl alcohol; ethylene glycol, maleic anhydride, octyl alcohol and acetic anhydride; diethylene glycol, fumaric acid, tetrahydroabietyl alcohol and linseed oil fatty acids, alpha-propylene glycol and maleic anhydride; diethylene glycol, fumaric acid and benzyl alcohol; diethylene glycol, fumaric acid and tetrahydroabietyl alcohol; ethylene glycol, fumaric acid and omega-hydroxydecanoic acid; fumaric acid, diethylene glycol and linseed oil fatty acid monoglycerides; etc. Reference is made to various copending applications of mine for more detailed information regarding the ingredients, the preparation, and additional examples of modified and unmodified unsaturated alkyd resins that may be copolymerized with a compound of the kind embraced by Formula I and the resulting aldehyde-reactable copolymer then reacted with an aldehyde, for instance, my copending applications Serial Nos. 540,142, filed June 13, 1944, now Patent No. 2,443,740, issued June 22, 1948; 555,194, filed September 21, 1944; 564,723, filed November 22, 1944, now Patent No. 2,443,741, also issued June 22, 1948; 616,648, filed September 15, 1945; 653,959, filed March 12, 1946, now Patent No. 2,485,294, issued October 18, 1949; 700,833, filed October 2, 1946; and 702,599, filed October 11, 1946.

Mixtures of any of the aforementioned polymerizable materials may be copolymerized with a single or with a plurality of triazine derivatives of the kind embraced by Formula I prior to reaction with the aldehyde. For example, I may copolymerize with the triazine derivative an unsaturated alkyd resin alone, e. g., diethylene glycol maleate, etc., or a compound containing a $CH_2=C<$ grouping alone, e. g., styrene, diallyl phthalate, etc., or a mixture of such a resin and compound. Or, I may copolymerize or partly copolymerize a cyanuric triester of a primary, ethylenically unsaturated monohydric alcohol containing at least 3 and not more than 10 carbon atoms (e. g., triallyl cyanurate, trimethallyl cyanurate, etc.) and a compound of the kind embraced by Formula I (e. g., 2-alloxy-4,6-diamino-1,3,5-triazine, 2-amino-4,6-dialloxy-1,3,5-triazine, etc.), in the presence or absence of other materials copolymerizable therewith, and then react the resulting copolymer with an aldehyde, e. g., formaldehyde, under acid, neutral or alkaline conditions.

Instead of forming a copolymer of the uncondensed triazine derivative, I may copolymerize a partial reaction product of an aldehyde and the triazine derivative, e. g., a reaction product containing a methylol grouping, with another material which is copolymerizable therewith, numerous examples of which have been given above. Illustrative examples of such reaction products are the products of reaction of formaldehyde and 2 - alloxy - 4,6 - diamino-1,3,5-triazine or 2-amino - 4,6 - dialloxy - 1,3,5 - triazine, which reaction products contain a methylol grouping. More specific examples of such reaction products are 2-(N-methylolamino)-4,6-dialloxy-1,3,5-triazine and 2-alloxy-4,6-di-(N,N'-methylolamino)-1,3,5-triazine.

The proportions of triazine derivative and reactive material which is copolymerized therewith may be varied as desired or as conditions may require, but ordinarily the proportions thereof in the polymerizable mixture will be within the range of, by weight, from about 10 to 90 per cent of the former to from 90 to 10 per cent of the latter.

Any suitable means may be used in effecting polymerization of the triazine derivative alone or admixed with a compound copolymerizable therewith. Heat or light or both, with or without a polymerization catalyst, may be employed. Ultra-violet light is more effective than ordinary light. The polymerization of the polymerizable composition is preferably accelerated by incorporating a polymerization catalyst therein. The polymerization catalysts include the organic superoxides, alcoholic and acidic peroxides. Among the preferred catalysts are: the acidic peroxides, e. g., benzoyl peroxide, phthalic peroxide, succinic peroxide and benzoyl acetic peroxide; fatty acid peroxides, e. g., coconut oil acid peroxides, lauric peroxide, stearic peroxide and oleic peroxide; alcohol peroxides, e. g., tertiary-butyl hydroperoxide; and terpene oxides, e. g., ascaridole. Still other polymerization catalysts may be used in some cases, e. g., soluble cobalt salts (particularly the linoleate and naphthenate), p-toluene sulfonic acid, aluminum chloride, stannic chloride, boron trifluoride, etc.

The concentration of the catalyst employed is usually small, i. e., for the preferred catalysts from, by weight, about 1 part catalyst per thousand parts of the material or mixture of materials to be polymerized to about 2 parts catalyst per hundred parts of the said material or mixture. If an inhibitor be present, up to 5% or even more by weight of catalyst, based on the weight of the polymerizable composition, may be necessary according to the concentration of the inhibitor. In most cases the temperature of copolymerization will be within the range of 40° to 200° C., usually within the range of 60° to 130° C., depending upon the particular mixture of copolymerizable materials employed, the particular catalyst, if any, used, the rapidity of copolymerization wanted, and other influencing factors.

In some cases it is desirable to incorporate a polymerization inhibitor with the monomeric triazine derivative or mixture thereof with another copolymerizable material or materials. When it is desired to use this mixture, a catalyst is added in an amount sufficient to promote the polymerization and to form a polymer or copolymer. By careful control of the concentrations of inhibitor and catalyst, a uniform product is obtainable with a good reaction velocity. Suitable polymerization inhibitors for this purpose are phenolic compounds, especially the polyhydric phenols, and aromatic amines. Specific examples of this group of inhibitors are hydroquinone, benzaldehyde, ascorbic acid, isoascorbic acid, resorcinol, tannin, sym.-di - (beta - naphthyl)-p-phenylene diamine, phenolic resins, sulfur compounds, etc. The concentration of the inhibitor is preferably low, and less than about 1% by weight of the polymerizable composition is usually sufficient. However, with the preferred inhibitors, e. g., polyhydric phenols and aromatic amines, I prefer to use only about 0.01 to about 0.1% by weight of inhibitor, based on the weight of the polymerizable composition.

The reaction between the formaldehyde or other aldehydic reactant and the monomeric triazine derivative may be so conducted that no extensive polymerization, if any, of the unsaturated ester grouping takes place. This may be done, for example, by effecting the reaction at a relatively low temperature, e. g., at room temperature (20° to 30° C.) or lower, in the absence of a polymerization inhibitor, with or without a mild condensation catalyst, or at a higher temperature, (e. g., 40° to 90° C.) in the presence of a polymerization inhibitor. Thereafter, a polymerization catalyst, e. g., benzoyl peroxide or any of the other catalysts previously mentioned, may be added and polymerization effected conjointly with further condensation at a suitable temperature, e. g., temperatures of the order of about 60° to 130° or 140° C. or thereabove, thereby causing or advancing resinification, e. g., to a substantially insoluble, substantially infusible state.

Alternatively, the reaction between the aldehydic reactant and the monomeric triazine derivative may be carried out so that both polymerization and condensation take place substantially simultaneously. This may be accomplished, for example, by heating the mixed reactants, in the absence of a polymerization inhibitor, in the presence of a catalyst capable of functioning both as a condensation catalyst and a polymerization catalyst, or of both a condensation catalyst and a polymerization catalyst, numerous examples of which have been given hereinbefore. Certain peroxide catalysts, more particularly an acidic or an acid-yielding peroxide, can act both as a polymerization catalyst due to the peroxide bond and as a condensation catalyst due to its acidity or to the acid which it may liberate during use. Examples of such peroxide catalysts are hydrogen peroxide, the organic acid peroxides, e. g., benzoyl peroxide, acetyl peroxide, etc., halogenated organic acid peroxides, e. g., dichloroacetic peroxide, trichloroacetic peroxide, dibromoacetic peroxide, etc. Other catalysts which are capable of acting as conjoint condensation and polymerization catalysts are, for instance, persulfuric acid and derivatives thereof, more particularly the persulfates thereof, e. g., sodium persulfate, potassium persulfate, etc. If a separate polymerization catalyst is employed, I prefer to use one which is relatively stable during the condensation reaction, for instance, alcohol peroxides (e. g., tert.-butyl hydroperoxide, tert.-amyl hydroperoxide, etc.) and peroxides equivalent to alcohol peroxides, for example, oleic peroxide and peroxides the structure of which has not been fully elucidated, e. g., ascaridole, cyclohexene peroxide, etc. If desired, ultraviolet light may be used during the condensation reaction, in lieu of or in addition to a polymerization catalyst, thereby to accelerate the polymerization.

The reaction between the aldehyde, e. g., formaldehyde, and the monomeric or polymeric triazine derivative may be carried out in the presence of solvents or diluents, other natural or synthetic bodies (numerous examples of which hereafter are given), or while admixed with other materials which are reactable or non-reactable with the aldehydic reactant or with the triazine derivative, e. g., urea, thiourea, cyanamide, dicyandiamide, terephthalic diamide, acetamide, chlorinated acetamides, methyl ethyl ketone, etc.; aldehyde-reactable triazinyl compounds other than the triazine derivatives used in practicing the present invention, e. g., melamine, ammeline, ammelide, etc.; phenol and substituted phenols, e. g., the cresols, the xylenols, the tertiary-alkyl phenols, etc.; monohydric and polyhydric alcohols, e. g., butyl alcohol, amyl alcohol, heptyl alcohol, n-octyl alcohol, 2-ethylhexyl alcohol, ethylene glycol, propylene glycol, glycerine, polyvinyl alcohol, etc.; amines, including propyl amine, dibutyl amine, aniline, etc.; cyanuric triesters, for instance, cyanuric triesters of a primary, ethylenically unsaturated monohydric alcohol containing at least 3 and not more than 10 carbon atoms, e. g., triallyl cyanurate, trimethallyl cyanurate, etc.; and the like.

The modifying reactants may be incorporated with the triazine derivative (monomeric or polymeric triazine derivative) and the aldehyde to form an intercondensation product by mixing all the reactants and effecting condensation therebetween under acid, alkaline or neutral conditions, or by various permutations of reactants. For example, I may effect partial reaction or condensation between the chosen aldehyde and the triazine derivative under acid, alkaline or neutral conditions, then add the modifying reactant, e. g., urea, melamine, n-butanol, etc., and effect further condensation under acid, alkaline or neutral conditions. Or, I may first partially react urea, melamine or other aldehyde-reactable modifying reactant with a molecular excess of an aldehyde under acid, alkaline or neutral conditions, then add the triazine derivative and effect further condensation under the same or different conditions of acidity or alkalinity. Or, I may separately partially react (1) urea, melamine or other aldehyde-reactable modifying reactant and an aldehyde and (2) a triazine derivative of the kind embraced by Formula I and an aldehyde, thereafter mixing the two products of partial reaction and effecting further reaction or condensation therebetween. The reactants of (1) and (2) may be partially condensed under acid, alkaline or neutral conditions.

In producing my new products, the choice of the aldehyde is dependent largely upon economic considerations and the particular properties desired in the finished product. I prefer to use as the aldehydic reactant formaldehyde or compounds engendering formaldehyde, e. g., paraformaldehyde, hexamethylenetetramine, trioxane, etc. Illustrative examples of other aldehydes that may be employed are acetaldehyde, propionaldehyde, butyraldehyde, heptaldehyde, octaldehyde, acrolein, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives, of urea, thiourea, iminourea, and of substituted ureas, thioureas and iminoureas, mono- and poly-(N-carbinol) derivatives of amides of polycarboxylic acids, e. g., maleic, itaconic, fumaric, adipic, malonic, succinic, citric, phthalic etc., mono- and poly-(N-carbinol) derivatives of the aminotriazoles, of the aminodiazines, etc. Good results are obtained with aldehyde-addition products such as a methylol urea, more particularly mono- and dimethylol ureas, and a methylol melamine, e. g., monomethylol melamine and polymethylol melamines (di-, tri-, tetra-, penta- and hexamethylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the monomeric or polymeric triazine derivative may be varied over a wide range depending, for example, upon the number of aldehyde-reactable amino groups in the triazine derivative and upon the particular properties desired in the finished product. Ordinarily these reactants are employed in an amount corresponding to at least 1 mol of the aldehyde, specifically formaldehyde, for each mol of the triazine derivative. Thus I may use, for instance, from about 1 to 5 or 6 or more mols of the aldehyde for each mol of a monomeric triazine derivative and equivalent molar ratios when the triazine derivative is in polymeric state. In the case of a polymeric triazine reactant, the aldehyde may be employed in an amount corresponding to from about 1 to 6 or more mols thereof for each aminotriazinyl grouping in the polymer. Good results are obtained when the aldehyde is used in an amount corresponding to from about 1 to 2 mols thereof for each amino grouping in the monomeric or polymeric triazine derivative. When the aldehyde is available for reaction in the form of an alkylol derivative, more particularly a methylol derivative, e. g., dimethylol urea, trimethylol melamine, etc., amounts of such alkylol derivatives corresponding to or higher (e. g., from a few per cent more to 15 or 20 times as much) than the relative amounts mentioned above with reference to the aldehyde may be employed.

In order that those skilled in the art better may understand how the present invention may be carried into effect, the following examples are given by way of illustration and not by way of limitation. All parts are by weight, except where specified otherwise.

Example 1

| | Parts |
|---|---|
| 2-amino-4,6-dialloxy-1,3,5-triazine | 520.0 |
| Aqueous formaldehyde (approx. 37% HCHO) | [1] 200.0 |
| Dioxane | 103.5 |

[1] By volume.

In a reaction vessel are placed a mixture of the triazine derivative, dioxane and formaldehyde which has been neutralized with dilute sodium hydroxide to a pH of 8.5. The mixture is allowed to react at room temperature (of about 20° to 30° C.) for about 16 hours while constantly agitating the mass. A clear solution containing 2-(N-methylolamino) - 4,6 - dialloxy-1,3,5-triazine results. Sufficient water is added to the solutions to precipitate the methylol derivative. The 2-(N-methylolamino)-4,6-dialloxy-1,3,5-triazine is obtained in the form of glittering, crystalline, white plates which softens at 53°–60° C. and melt at 67°–76° C. It is soluble in benzene, alcohols (e. g. methyl and ethyl alcohols), and is slightly soluble in water and petroleum ether. A purer product is obtained by reprecipitation from a solution thereof with a non-solvent.

Example 2

| | Parts |
|---|---|
| 2 - (N-methylolamino) - 4,6 - dialloxy-1,3,5-triazine | 100 |
| Benzoyl peroxide | 5 | are mixed and heated at about 110° C. A vigorous reaction occurs within a few minutes, and a hard polymeric mass is obtained upon heating for a short additional period.

Example 3

| | Parts |
|---|---|
| 2 - (N-methylolamino) - 4,6 - dialloxy - 1,3,5-triazine | 30 |
| Diethylene glycol fumarate sebacate[1] | 70 |
| Benzoyl peroxide | 1 |

[1] Note: This unsaturated alkyd resin is prepared by effecting reaction between 6 mols diethylene glycol, 5 mols fumaric acid and 1 mol sebacic acid.

The above ingredients are mixed and warmed to effect solution. A hard, well-cured copolymer is obtained by heating the resulting polymerizable composition for 1 hour at 100° C.

Example 4

| | Parts |
|---|---|
| 2 - (N-methylolamino) - 4,6-diamino-1,3,5-triazine | 250.0 |
| Benzoyl peroxide | 7.5 |

Six plies of alpha-pulp paper, 10 mils thick, are coated and impregnated with a mixture of the above ingredients warmed to about 85° C. The impregnated sheets are superimposed and laminated together by heating between glass plates at contact pressure for 1 hour at 110° C. A hard, rigid laminated article is obtained.

Example 5

2-alloxy-4,6-di-(N,N'-methylolamino)-1,3 5-triazine is prepared by effecting reaction between 2-alloxy-4,6-diamino-1,3,5-triazine and formaldehyde in essentially the same manner as described under Example 1 with reference to the preparation of 2-(N-methylolamino)-4,6-dialloxy-1,3,5-triazine with the exception that in this case 405 parts of 2-alloxy-4,6-diamino-1,3,5-triazine is used in place of 520 parts of 2-amino-4,6-dialloxy-1,3,5-triazine and 400 parts by volume of 37% aqueous formaldehyde is employed instead of 200 parts by volume of said formaldehyde.

One part of acetyl peroxide dissolved in dibutyl phthalate is mixed with 100 parts of the 2-alloxy-4,6 - di - (N,N'-methylolamino) - 1,3,5 - triazine. The resulting mixture is converted, by a simultaneous polymerization and condensation reaction, to a substantially insoluble, substantially infusible resin by heating until fully cured on a 130° C. hot plate.

Example 6

| | Parts |
|---|---|
| 2-alloxy-4,6-di-(N,N'-methylolamino) - 1,3,5-triazine | 20 |
| Diethylene glycol maleate | 80 |
| Lauroyl peroxide | 2 | are mixed and heated together for 1 hour at 100° C. and for another hour at 110° C. to yield a well-cured resinous copolymer, which is opaque and vesiculated due to the liberation of volatile components.

Example 7

| | Parts |
|---|---|
| 2-alloxy-4,6-di-(N,N'-methylolamino) - 1,3,5-triazine | 30 |
| Diallyl phthalate | 70 |
| Benzoyl peroxide | 2 | yield a resinous copolymer upon heating a mixture of the said ingredients for approximately 5 hours at 110° C. The product is similar to that of Example 6.

Similar results are obtained when the polymerizable ingredients of Examples 6 and 7 are mixed and copolymerized, using the same or different peroxide catalysts or mixtures thereof.

Example 8

| | Parts |
|---|---|
| 2-amino-4,6-dialloxy-1,3,5-triazine | 500 |
| Aqueous formaldehyde (approx. 37% HCHO) | [1] 200 |
| Dioxane | 775 |

[1] By volume.

To 500 parts of 2-amino-4,6-dialloxy-1,3,5-triazine dissolved in 775 parts of warm dioxane there is added 200 parts by volume of aqueous formaldehyde adjusted to a pH of 3 with 6N hydrochloric acid. The mixture is warmed gently on a steam bath for about 1 hour and is then allowed to stand for about 16 hours. Thereafter an excess of water is added to precipitate an oily reaction product of the formaldehyde and the triazine derivative. The oil is dissolved in about 265 parts of benzene and the benzene solution washed twice with 100 parts, each time, of a 1% aqueous solution of sodium hydroxide. The washed benzene solution of the oil is heated to evaporate the benzene, leaving a clear, yellow oil which does not crystallize.

One hundred parts of this oily product is mixed with 1 part of benzoyl peroxide. After heating for 5 hours at 100° C. a thick, resinous syrup is obtained. Upon heating for an additional 5 hours at the same temperature, the syrup cures to a resinous mass which is somewhat plastic while hot but a hard and brittle resin when cold. This resin has a Barcol hardness of about 10.

Example 9

| | Parts |
|---|---|
| 2-alloxy-4,6-diamino-1,3,5-triazine | 167.0 |
| Aqueous formaldehyde (approx. 37.1% HCHO) | 388.8 |
| Aqueous ammonia (approx. 28% NH$_3$) | 40.0 |
| Sodium hydroxide in 50 parts water | 0.4 |
| Di-tert.-butyl hydroquinone (polymerization inhibitor) | 0.2 |

All of the above ingredients are heated together under reflux at the boiling temperature of the mass for 30 minutes, yielding a resinous syrup. This syrup is potentially heat-curable, as evidenced by the fact that when a small amount of a curing agent is incorporated therein, e. g., about 1.0% by weight thereof of phthalic anhydride, sulfamic acid, maleic anhydride, maleic acid, melamine pyrophosphate, etc., and the resulting syrup is heated on a 140° C. hot plate, it cures to a substantially insoluble, substantially infusible state.

To the main batch of syrupy reaction product is now added maleic acid in an amount sufficient to bring the syrup to a pH of about 3 to 4. The syrup is heated for a few minutes more in order to incorporate the maleic acid thoroughly therein. This acid has a twofold role since it is capable of both lowering the pH and co-reacting with the resinous syrup, more particularly through the allyl grouping of the polymerizable resin.

The resulting syrup is mixed with 280 parts of alpha-cellulose in flock form and 5% by weight of lauroyl peroxide, based on the weight of the resinous syrup, to form a molding (moldable) composition. The lauroyl derivative functions both as a catalyst and as a mold lubricant. The wet molding compound is dried at 60° C. until sufficient moisture has been removed so that the composition can be molded satisfactorily. A sample of the dried and ground molding compound is molded for 10 minutes at 130° C. under a pressure of 2000 pounds per square inch. The molded piece is white, hard, well-cured, has an excellent gloss and surface finish, and also excellent arc and water resistance. The molded piece shows little "after-shrinkage" upon removal from the mold, and does not discolor when heated at a temperature of the order of 70° to 80° C. for a prolonged period.

Molding compositions of the kind embraced by this example are particularly amenable to the use of the so-called "cold-molding" technique, especially those compositions wherein large percentages of filler are present.

Example 10

| | Parts |
|---|---|
| 2-alloxy-4,6-diamino-1,3,5-triazine | 33.4 |
| Furfural | 59.6 |
| Sodium hydroxide in 5 parts water | 0.1 |
| Di-tert.-butyl hydroquinone | 0.03 | are heated together under reflux at the boiling temperature of the mass for 15 minutes, yielding a brownish, resinous syrup. This syrup is potentially heat-curable, as evidenced by the fact that when a small amount of a curing agent is incorporated therein, e. g., maleic acid, ammonium chloride, melamine pyrophosphate, ammonium sulfamate, etc., and the resulting syrup is heated on a 140° C. hot plate, it cures to a substantially insoluble, substantially infusible state. If desired, the curing of the resin may be accelerated by incorporating benzoyl peroxide or other polymerization catalyst therein in addition to curing agents of the kind mentioned above and elsewhere herein.

The resinous composition of this example may be used in the production of molding compounds.

Example 11

| | Parts |
|---|---|
| 2-alloxy-4,6-diamino-1,3,5-triazine | 16.7 |
| 2-amino-4,6-dialloxy-1,3,5-triazine | 20.8 |
| Acrolein | 33.6 | are mixed together, and the resulting mixture heated to about 50° C. An exothermic reaction takes place and a resinous composition is formed as a result of the reaction of the acrolein with both the amino and alloxy groupings of the triazine derivatives.

Example 12

| | Parts |
|---|---|
| 2-alloxy-4,6-diamino-1,3,5-triazine | 33.4 |
| Acrolein | 33.6 |
| Sodium hydroxide in 5 parts water | 0.1 |
| Water | 100.0 | are heated together under reflux at the boiling temperature of the mass for 15 minutes. When a sample of the resulting resin is heated on a 140° C. hot plate, it cures to an infusible state in the absence of a curing agent. The addition of a curing agent such as mentioned in prior examples and elsewhere herein accelerates the curing of the resin to an insoluble and infusible state. The cured resin is resistant to attack by alcohols and various ester and hydrocarbon solvents. The reactive resinous material of this example may be used in the preparation of molding compounds or as a modifier of other synthetic resins.

Example 13

| | Parts |
|---|---|
| 2-amino-4,6-dialloxy-1,3,5-triazine | 20.8 |
| Paraldehyde (paraacetaldehyde) | 13.2 |
| Tertiary-butyl hydroperoxide | 1.0 | are mixed and heated at approximately 60° C. to yield a resinous composition which initially is thermoplastic, but which polymerizes upon further heating at 100° C. to a hard, substantially infusible state.

Example 14

| | Parts |
|---|---|
| 2-alloxy-4,6-diamino-1,3,5-triazine | 167 |
| Aqueous formaldehyde (approx. 37% HCHO) | 162 |

In a 3-necked, round-bottomed reaction vessel, fitted with a stirrer and a reflux condenser, are placed the above-stated amounts of triazine derivative, which corresponds to one molar quantity, and aqueous formaldehyde, which corresponds to about a two-molar amount of HCHO. The vessel is placed on a steam bath and heating and stirring begun. After reaction has proceeded in this manner for 1 hour, the condenser is arranged for downward distillation and as much water as possible is distilled from the reaction mass under reduced pressure. When the reaction mass becomes too viscous to stir, it is poured into a tray and heated in a forced-draft oven at 125° C. to dehydrate it completely. Before heating in the oven the reaction product is a very viscous resinous mass. After oven drying it is a clear, white, thermoplastic resinous solid, which is brittle at room temperature.

The solid resin obtained as above described is ground to approximately 60-mesh particle size. When a sample of this resin is heated, there is no change until a temperature of 112° C. is reached, and then the powder softens. At 115° C. the resin fuses to a very viscous mass, and when heated above 140° C. it loses its thermoplasticity. The solubility characteristics of the powdered resin are shown below, using 5 parts by weight of the resin to 100 parts by volume of solvent:

| Solvent | Solubility | | |
|---|---|---|---|
| | Cold | Hot | On Cooling |
| Butanol | Insol | Sol | Precipitates. |
| Heptane | Insol | Insol | Precipitates. |
| Butyl acetate | Insol | Insol | Precipitates. |
| Pyridine | Partly sol | Sol | Soluble. |
| Chloroform | Partly sol | Partly sol | Soluble. |
| Methyl "Cellosolve" | Partly sol | Sol | Soluble. |
| Tetrachloroethane | Partly sol | Sol | Partly soluble. |
| Acetone | Insol | Insol | Partly soluble. |

The following results are obtained when samples of the ground resin having incorporated therein 2% by weight thereof of powdered benzoyl peroxide are molded at 100° C. under a pressure of 2000 pounds per square inch for varying periods of time, the molded pieces heated for 12 hours at 90° C., and thereafter tested for water-absorption by boiling in water for 30 minutes and determining the increase in weight, which is recorded as percentage of water absorbed:

| Time of Cure | Per Cent Water Absorbed |
|---|---|
| 5 | 2.08 |
| 10 | 2.50 |
| 15 | 2.43 |
| 30 | 2.51 |
| 60 | 2.30 |

When other samples are similarly prepared and molded, but the heating at 90° C. omitted prior to testing, the following results are obtained:

| Time of Cure | Per Cent Water Absorbed |
|---|---|
| 5 | 3.17 |
| 10 | 2.39 |
| 15 | 1.31 |
| 30 | 2.01 |
| 60 | 1.29 |

*Example 15*

Parts
2-alloxy-4,6-diamino-1,3,5-triazine _____ 501
Aqueous formaldehyde (approx. 37% HCHO) _486

Essentially the same procedure is followed as described under Example 14. The amount of triazine derivative corresponds to a three-molar quantity, while the aqueous formaldehyde corresponds to about a six-molar amount of HCHO. As soon as solution of the triazine derivative has been effected, the system is connected to a water aspirator and distillation to remove the water is begun. After removing 300 parts of water, the resinous reaction product is almost too thick and viscous to stir. The viscous resin is poured while hot onto a flat tray and placed in a 130°–140° C. forced-draft oven for about 4 hours or until the clear resin which results has a softening point of about 110°–120° C. Upon removal from the oven and cooling, the solid resin is crushed and screened to about 60-mesh particle size.

The resin granules have little, if any, solubility in the cold in alcohol, methyl ethyl ketone, ethylene dichloride or butyl acetate, but swell somewhat in dioxane on standing.

Fifty parts of the granular resin is added to 200 parts of dioxane, and the resulting mixture is heated on a steam bath for 45 minutes with occasional shaking. Some of the resin dissolves, but most of it merely swells. The swollen, gel-like particles are removed by filtering through a cheese-cloth strainer. A sample of the resulting solution, which contains approximately 16% by weight of resin solids, is poured upon a glass plate, air-dried and then baked for 2 hours at 100° C. A clear, fairly hard resinous film is formed on the plate.

To another sample comprising 90 parts of the above resin solution is added 0.286 part of benzoyl peroxide. Sheets of alpha-cellulose pulp paper are immersed in this solution for 15 to 20 minutes, the excess solution is allowed to drain off, and the sheets are allowed to air dry for 2½ hours. Thereafter they are further treated with the resin solution by immersing therein for 3 to 4 minutes and again allowed to air dry. A laminated article is produced by superimposing nine plies of the dried sheets and heating the resulting assembly between stainless steel platens first for 1 minute with the platens at 150° C. (press closed) and then for 8 minutes at 150° C. under a pressure of 500 pounds per square inch.

*Example 16*

Parts
2-alloxy-4,6-diamino-1,3,5-triazine _____ 208
Aqueous formaldehyde (approx. 37% HCHO) 80
Water _____ 100 are heated together under reflux on a steam bath for 3 hours with occasional shaking. (The initial mixture is acidic due to the formic acid in the aqueous formaldehyde.) The water is removed from the reaction mass at the end of this period by heating on a steam bath under reduced pressure. A clear, viscous solution is obtained.

To 200 parts of the viscous solution are added 50 parts water, 50 parts 2B alcohol and 4 parts benzoyl peroxide to form a coating and impregnating composition. ("2B alcohol" is the name commonly given to a commercially available grade of denatured ethyl alcohol in which is used a particular denaturant. It is 190° proof ethyl alcohol denatured with 0.5 gallon of benzene for each 100 gallons of ethyl alcohol. Reference: Lange's Handbook of Chemistry, page 1686, published in 1946 by Handbook Publishers, Inc., Sandusky, Ohio.) A solution is obtained which is clear while warm but turbid at room temperature. Alpha-cellulose pulp paper is impregnated with this solution by immersing it in the warm solution, then air drying it for about 48 hours. Under these conditions good impregnation of the paper is secured. Six plies of the dried sheets are laminated together by heating the assembly between glass plates for 2 hours at 100° C. under a pressure of about 3 pounds per square inch. A laminated article having a Barcol hardness of about 50 is obtained.

*Example 17*

Parts
2-alloxy-4,6-diamino-1,3,5-triazine _____ 208
Aqueous formaldehyde (approx. 37% HCHO) 80
1% aqueous solution of sodium hydroxide____ 100 are heated together under reflux on a steam bath for 2 hours with occasional shaking. Thereafter the water is removed by heating on a steam bath under reduced pressure. A cloudy, viscous liquid is obtained with some solid matter suspended therein. The same procedure is followed in making a coating and impregnating composition as described in Example 16. This solution is clear while hot but separates on cooling. The same process is employed in impregnating alpha-cellulose paper with the hot solution as set forth under Example 16 with the exception that the wet paper is air dried for 24 hours. A laminated article having a Barcol hardness of 30 to 50 is obtained by heating six plies of the superimposed, dried sheets between glass plates for 2½ hours at 100° C. under a pressure of about 3 pounds per square inch.

Example 18

| | Parts |
|---|---|
| 2-amino-4,6-dialloxy-1,3,5-triazine | 52 |
| Melamine | 63 |
| Aqueous formaldehyde (approx. 37% HCHO) | 223 |
| n-Butanol | 250 |

The mixture of the above ingredients in the stated amounts is heated to 91° C. over a period of 20 minutes, and heating continued thereafter for about 2¼ hours at 91°–99° C. while adding more butanol to replace the volatile matter which distills and thereby to keep constant the volume of the reaction mass. At the end of this period, further heating is continued under reduced pressure for about 1 hour and 20 minutes at about 93°–99° C. until the liquid resinous composition contains about 87% of resin solids. This liquid resin is thinned first with butanol to 67% resin solids and then with xylene to 50% solids. A sample of the resulting coating composition is applied to a tin plate, and the coated plate is baked for 3 hours at 150° C. A well-cured film having good color and a good bond to the plate is obtained.

Example 19

| | Parts |
|---|---|
| 2-alloxy-4,6-diamino-1,3,5-triazine | 83.5 |
| Aqueous formaldehyde (approx. 37% HCHO) | 162.0 |
| n-Butanol | 220.0 | are heated together for about 2 hours and 10 minutes at 87° to 100° C., additional butanol being added from time to time to replace the volatile matter removed by distillation and to keep constant the volume of the reaction mass. The resulting liquid resinous composition is thinned to 50% resin solids with butanol or a mixture of butanol and xylene to form a liquid coating composition.

A white baking enamel is made from a mixture of a solution in xylene of an oil-modified alkyd resin and a xylene-butanol solution of the liquid resin of this example (50% resin solids) in the ratio of 3 parts of the former to 1 part of the latter, based on the amount of resin solids present in each. Titanium dioxide is incorporated into the enamel so that the enamel has a 1:1 pigment-to-vehicle ratio. The enamel is thinned with xylene to yield a composition containing approximately 55% of non-volatile matter. This enamel is suitable for use as a protective coating on metals of various kinds, e. g., iron, steel, tin, aluminum, etc.

Coating compositions made by interaction of a mono-unsaturated diamino triazine (e. g., 2-alloxy-4,6-diamino-1,3,5-triazine), an aldehyde, specifically formaldehyde, and a monohydric alcohol, e. g., n-butyl alcohol, possesses the property of curing in the presence of air, that is, oxygen-convertibility. This phenomenon can be seen when such compositions, more particularly those which contain driers, e. g., cobalt or lead naphthenate, are heated at an elevated temperature. Under certain conditions, e. g., when the thickness of the film is excessive, wrinkled films are obtained.

Example 20

| | Parts |
|---|---|
| Aqueous formaldehyde (approx. 37% HCHO) | 162.0 |
| Hydroquinone | 0.08 |
| 2-alloxy-4,6-diamino-1,3,5-triazine | 83.5 |
| Phosphoric acid (85%) | 0.5 |
| n-Butanol | 220.0 |

The hydroquinone is dissolved in the aqueous formaldehyde and the resulting solution is adjusted to a pH of 8.0 with 0.5N sodium hydroxide. A mixture of this solution and the triazine derivative is placed in a suitable reaction vessel provided with a reflux condenser, and therein heated until it begins to reflux. The reflux condenser is arranged for downward distillation and then the butanol with the phosphoric acid dissolved therein slowly added when the reaction mass is at a temperature of 85° C., keeping the temperature of the mass at 85°–90° C. during this addition.

Reaction is continued at 94°–110° C. for about 4½ hours, adding additional butanol from time to time to replace the volatile matter which distills and to keep constant the volume of the reaction mass. After filtering the resulting liquid mass through a pressure filter, it is heated under reduced pressure at about 90° C. until the liquid resin contains about 83.4% resin solids. To this liquid resin are now added 58 parts butanol (n-butanol) and 87.5 parts xylene to reduce the resin solids content to about 50%.

Portions of this coating composition (composition A), modified as described below, are applied to tin panels, and the coated panels baked at 125° C. for 3 hours and then for 2 hours at 150° C.

1. Twenty parts of composition A containing two drops of tert.-butyl hydroperoxide and one drop of a solution of cobalt naphthenate yields a hard, colorless, flexible film which shows no lines or cracks when examined after the coated panel has been bent around a ½-inch mandrel and thereafter straightened.

2. A mixture of 15 parts of composition A and 20.5 parts of a xylene solution of a soyabean oil acid-modified glyceryl phthalate fumarate resin, which mixture contains about 53% resin solids, yields a very good film, which is hard, colorless, flexible and shows no lines or cracks when tested as described under (1). Similar films result when the mixture has incorporated therein 2 drops of tert.-butyl hydroperoxide or 1 drop of a solution of cobalt naphthenate or both.

Example 21

| | Parts |
|---|---|
| 2-alloxy-4,6-diamino-1,3,5-triazine | 83.5 |
| Melamine | 63.0 |
| Aqueous formaldehyde (approx. 37% HCHO) | 405.0 |
| n-Butanol | 440.0 | are heated together at 93°–106° C. for about 6¼ hours, additional butanol being added from time to time to replace the volatile matter which distills off and to keep constant the volume of the reaction mass. At the end of this reaction period, distillation is continued under reduced pressure at a temperature of about 90° C. until the liquid resinous mass contains about 72.3% resin solids.

The liquid resin is diluted with butanol or mixtures of butanol and xylene until it contains, for example, about 50% resin solids. The thinned liquid resin may be used as a coating composition as described in some of the prior examples and elsewhere in this specification.

*Example 22*

| | Parts |
|---|---|
| Partial polymer of 2-alloxy-4,6-diamino-1,3,5-triazine | 33.4 |
| Methacrolein | 52.0 | are mixed and heated at about 50° C. until a substantially insoluble, substantially infusible resin results. The partial polymer is produced by heating 33.4 parts of the monomeric triazine derivative having incorporated therein 0.4 part benzoyl peroxide for 1 hour at 100° C.

It will be understood, of course, by those skilled in the art that my invention is not limited to the specific reactants nor to the specific conditions of reaction shown in the above illustrative examples. Thus, instead of formaldehyde, paraldehyde, furfural, acrolein or methacrolein, any other aldehyde or compound engendering an aldehyde, numerous examples of which have been given hereinbefore, may be employed. Also, I may use instead of 2-amino-4,6-dialloxy-1,3,5-triazine or 2-alloxy-4,6-diamino-1,3,5-triazine in the various examples where such triazines derivatives are employed, 2-amino-4,6-dimethalloxy-1,3,5-triazine, 2-methalloxy-4,6-diamino-1,3,5-triazine, mixtures thereof with each other or with either or both of the corresponding alloxy derivatives, or any of the other compounds of the kind embraced by Formula I, or mixtures thereof with each other or with either or both of the aforementioned alloxy and methalloxy derivatives. The reaction may be effected at temperatures ranging from room temperature to the fusion or boiling temperature of the mixed reactants, the reaction proceeding more slowly at normal temperature than at elevated temperatures in accordance with the general law of chemical reactions. Also, instead of using the particular polymerization inhibitors, condensation catalysts and polymerization catalysts named in certain of the illustrative examples, any of the other inhibitors, condensation catalysts or polymerization catalysts hereinbefore mentioned may be employed.

The curing of the thermosetting or potentially thermosetting resinous compositions of this invention may be accelerated by incorporating therein a curing agent (or mixture of curing agents), for instance a direct or active curing catalyst (e. g., phthalic acid, phthalic anhydride, maleic acid, maleic anhydride, succinic acid, tartaric acid, citric acid, etc.), or a latent curing catalyst (e. g., an ammonium salt of phosphoric acid, ammonium chloride, ammonium silicofluoride, ammonium borofluoride, benzoyl mercaptobenzothiazole, ammonium salt of toluene sulfonic acid, phthaloyl mercaptobenzothiazole, benzoyl phthalimide, etc.). Catalysts which are capable of intercondensing with the partial reaction product may be employed, for instance curing reactants such as glycine, sulfamic acid, chloroacetone, chloroacetyl urea, etc. The amount of curing catalyst, if used, may be varied as desired or as conditions may require, but ordinarily is within the range of 0.1 to 5 or 6 per cent by weight of the neutral, thermosetting or potentially thermosetting resinous composition.

As indicated hereinbefore and as further shown by a number of the examples the properties of the fundamental resins of this invention may be varied widely by introducing other modifying bodies before, during or after effecting condensation between the primary components. Thus as modifying agents I may use, for instance, monohydric alcohols, e. g., methyl, ethyl, propyl, butyl, hexyl, n-octyl, 2-ethylhexyl, decyl, dodecyl, cetyl, lauryl, capryl, or tetrahydrofurfuryl alcohol, pentanol or mixtures of isomeric pentanols, (which mixtures also may include n-pentanol), cyclohexanol, methylcyclohexanol, etc.; polyhydric alcohols, e. g., glycerol, pentaerythritol, dipentaerythritol, mannitol, sorbitol, ethylene glycol, diethylene glycol or any of the other dihydric alcohols hereinbefore mentioned, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides, e. g., cyanamide, dicyandiamine, stearamide, acrylamide, benzamide, phthalamide, benzene sulfonamides, toluene sulfonamides, etc.; amines, e. g., ethylene diamine, phenylene diamine, triethylene tetramine, etc.; ketones, including halogenated ketones, e. g., methyl ethyl ketone, acetone, chloroacetones, etc.; nitriles, including halogenated nitriles, e. g., acrylonitrile, methacrylonitrile, acetonitrile, chloroacetonitriles, etc.; acylated ureas, including halogenated acylated ureas, e. g., acetyl urea, propionyl urea, chloroacetylureas, etc.

Illustrative examples of other modifying bodies that may be incorporated into the resinous compositions of this invention are melamine-aldehyde condensation products (e. g., melamine-formaldehyde condensation products), urea-aldehyde condensation products (e. g., urea-melamine-formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc., polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with melamine-formaldehyde resins, fatty oil or fatty oil acid-modified alkyd resins, or other film-forming materials commonly used in protective-coating compositions. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example, in Moore Patent No. 2,218,474, issued October 15, 1940.

In the preparation of the coating compositions of this invention I prefer to interact (1) a triazine derivative of the kind embraced by Formula I, (2) an aldehyde, specifically formaldehyde, and (3) a monohydric alcohol, more particularly a primary monohydric alcohol. An alkylation reaction takes place, and an ether corresponding to the alkyl radical of the alcohol employed is formed. In such reactions I prefer to use n-butanol, but other primary monohydric alcohols may be employed, e. g., methanol, ethanol, n-propyl alcohol, isobutyl alcohol, etc.

Dyes, pigments, driers, curing agents, plasticizers, mold lubricants, opacifiers and various fillers (e. g., wood flour, glass fibers, asbestos, mineral wool, mica dust, powdered quartz, titanium dioxide, zinc oxide, talc, china clay, carbon black, etc.) may be compounded by conventional practice with the resinous materials of my invention, as desired or as conditions may require, in order to provide a coating, molding or other composition best adapted to meet a particular service use. For additional and more detailed information concerning the modifying ingredients that may be employed in producing coating compositions from my new resins, reference is made to the aforementioned Moore patent.

The modified and unmodified resinous compositions of this invention have a wide variety of uses. For example, in addition to their use in the production of coating and molding compositions, they may be employed as modifiers of other natural and synthetic resins. Thus, the thermoplastic resins may be used to improve the plasticity or flow characteristics of thermosetting resins which have insufficient or unsatisfactory plasticity during curing to an insoluble, infusible state, e. g., certain urea-formaldehyde resins where better flow during molding is desirable. This improved plasticity permits molding at lower pressures. The soluble resins of this invention also may be dissolved in solvents, e. g., benzene, toluene, xylene, amyl acetate, methyl ethyl ketone, butanol, etc., and used as laminating varnishes in the production of laminated articles wherein sheet materials, e. g., paper, cloth, sheet asbestos, glass cloth, etc., are coated or coated and impregnated with the resin solution, superimposed and thereafter united under heat and pressure. They also may be employed as an adhesive in making laminated plywood, as an impregnant of pulp preforms from which molded articles thereafter are made by subjecting the impregnated preform to heat and pressure, as impregnants for electrical coils and for other electrically insulating applications, for bonding together abrasive grains in the production of resin-bonded abrasive articles such, for instance, as grindstones, sandpapers, etc., in the manufacture of electrical resistors, etc. They also may be used for treating textile materials (e. g., cotton, linen, rayon and other cellulose-containing textiles, wool, silk and other natural or synthetic proteinaceous textiles, including nylon and textiles derived from casein, soyabeans, etc.), in filament, thread, yarn, fabric (woven or felted) or other form, in order to improve the properties of such textile materials, e. g., to increase the stiffness, to increase the service life, or otherwise to enhance the properties of the treated materials and to make them more useful or serviceable to the ultimate user. They also may be employed for treating leather in order to improve its appearance and physical properties.

I claim:

1. A composition comprising a synthetic material which is the product of reaction of ingredients including (1) an aldehyde and (2) a triazine derivative represented by the general formula

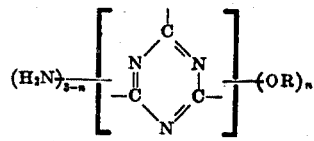

where $n$ represents an integer which is at least 1 and not more than 2, and R represents a polymerizable, monovalent, primary, monoethylenically unsaturated, aliphatic radical having at least 3 and not more than 10 carbon atoms and wherein the substituents attached to the carbon atoms of the aliphatic chain are selected from the class consisting of hydrogen, monochlorine and monovalent hydrocarbons, the ethylenic group being the sole unsaturated group in the said radical.

2. A composition as in claim 1 wherein the aldehyde is formaldehyde.

3. A composition as in claim 1 wherein $n$ is 1.

4. A composition as in claim 1 wherein $n$ is 2.

5. A heat-curable resinous composition comprising a heat-convertible product obtained by effecting partial reaction between ingredients comprising (1) formaldehyde and (2) a triazine derivative represented by the general formula

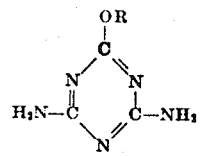

where R represents a polymerizable, monovalent, primary, monoethylenically unsaturated, aliphatic radical having at least 3 and not more than 10 carbon atoms and wherein the substituents attached to the carbon atoms of the aliphatic chain are selected from the class consisting of hydrogen, monochlorine and monovalent hydrocarbons, the ethylenic group being the sole unsaturated group in the said radical.

6. A product comprising the cured resinous composition of claim 5.

7. A composition comprising a resinous material obtained by effecting reaction between ingredients including (1) an aldehyde, (2) an alcohol and (3) a triazine derivative represented by the general formula

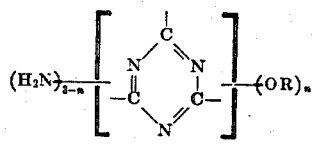

where $n$ represents an integer which is at least 1 and not more than 2, and R represents a polymerizable, monovalent, primary, monoethylenically unsaturated, aliphatic radical having at least 3 and not more than 10 carbon atoms and wherein the substituents attached to the carbon atoms of the aliphatic chain are selected from the class consisting of hydrogen, monochlorine and monovalent hydrocarbons, the ethylenic group being the sole unsaturated group in the said radical.

8. A composition as in claim 7 wherein the aldehyde of (1) is formaldehyde and the alcohol of (2) is a monohydric alcohol.

9. A composition comprising a resinous material obtained by effecting reaction between ingredients including (1) an aldehyde, (2) melamine and (3) a triazine derivative represented by the general formula

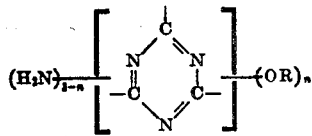

where $n$ represents an integer which is at least 1 and not more than 2, and R represents a polymerizable, monovalent, primary, monoethylenically unsaturated, aliphatic radical having at least 3 and not more than 10 carbon atoms and wherein the substituents attached to the carbon atoms of the aliphatic chain are selected from the class consisting of hydrogen, monochlorine and monovalent hydrocarbons, the ethylenic group being the sole unsaturated group in the said radical.

10. A composition comprising the resinous product of reaction of ingredients comprising an aldehyde and 2-alloxy-4,6-diamino-1,3,5-triazine.

11. A resinous composition comprising the product of reaction of ingredients comprising formaldehyde and 2-alloxy-4,6-diamino-1,3,5-triazine.

12. The reaction product of formaldehyde and 2-alloxy-4,6-diamino-1,3,5-triazine, said reaction product containing a methylol grouping.

13. The substantially insoluble, substantially infusible resinous product of reaction of ingredients comprising formaldehyde and 2-alloxy-4,6-diamino-1,3,5-triazine, said product being resistant to discoloration.

14. A product of simultaneous polymerization and condensation of 2-alloxy-4,6-di-(N,N'-methylolamino)-1,3,5-triazine.

15. A coating composition comprising the resinous product of reaction of formaldehyde, n-butanol, melamine and 2-alloxy-4,6-diamino-1,3,5-triazine.

16. A resinous composition comprising the product of reaction of ingredients comprising an aldehyde and 2-amino-4,6-dialloxy-1,3,5-triazine.

17. A composition comprising the resinous product of reaction of ingredients comprising formaldehyde and 2-amino-4,6-dialloxy-1,3,5-triazine.

18. A coating composition comprising the resinous product of reaction of formaldehyde, n-butanol, melamine and 2-amino-4,6-dialloxy-1,3,5-triazine.

19. The method of preparing new synthetic materials which comprises effecting reaction between ingredients including (1) an aldehyde and (2) a triazine derivative represented by the general formula

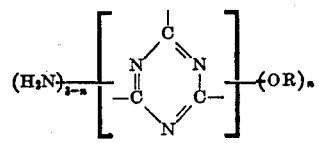

where $n$ represents an integer which is at least 1 and not more than 2, and R represents a polymerizable, monovalent, primary, monoethylenically unsaturated, aliphatic radical having at least 3 and not more than 10 carbon atoms and wherein the substituents attached to the carbon atoms of the aliphatic chain are selected from the class consisting of hydrogen, monochlorine and monovalent hydrocarbons, the ethylenic group being the sole unsaturated group in the said radical.

20. The method of preparing a resinous composition which comprises effecting partial reaction, in the presence of a polymerization inhibitor, between ingredients including (1) formaldehyde and (2) a triazine derivative represented by the general formula

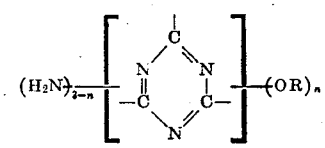

where $n$ represents an integer which is at least 1 and not more than 2, and R represents a polymerizable, monovalent, primary, monoethylenically unsaturated, aliphatic radical having at least 3 and not more than 10 carbon atoms and wherein the substituents attached to the carbon atoms of the aliphatic chain are selected from the class consisting of hydrogen, monochlorine and monovalent hydrocarbons, the ethylenic group being the sole unsaturated group in the said radical, and resinifying the resulting partial reaction product under heat in the presence of a polymerization catalyst in an amount effective to resinify the said reaction product.

EDWARD L. KROPA.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,275,467 | Pollack | Mar. 10, 1942 |
| 2,296,823 | Pollack | Sept. 22, 1942 |

Certificate of Correction

Patent No. 2,496,097 January 31, 1950

EDWARD L. KROPA

It is hereby certified that errors appear in the printed specification of the above numbered patent requiring correction as follows:

Column 3, line 27, after the syllable "hyde" insert a comma; column 6, line 52, after "1944" and before the semicolon insert , *now Patent No. 2,443,741, also issued June 22, 1948*; same column, lines 53 and 54, strike out ", now Patent No. 2,443,741, also issued June 22, 1948"; column 11, line 5, before "about" strike out "of"; line 9, for "solutions" read *solution*; line 13, for "softens" read *soften*; column 12, line 36, strike out "HCHO) _____ ¹ 200" and insert the same after "37%" in line 34; line 35, strike out "2-amino-4,6-dialloxy-1,3,5-triazine _____ 500"; column 15, lines 8 to 13, inclusive, first table, last two columns thereof, for

| Sol | | | Sol | |
|---|---|---|---|---|
| Insol | }Precipitates. | | Insol | Precipitates. |
| Insol | | | Insol | |
| Sol | | read | Sol | |
| Partly sol | }Soluble. | | Partly sol | Soluble. |
| Sol | Soluble. | | Sol | Soluble. |
| Sol | }Partly soluble. | | Sol | Partly soluble. |
| Insol | | | Insol | | column 17, line 72, for "possesses" read *possess*; column 18, line 24, before "slowly" insert *is*; column 19, line 31, for "triazines" read *triazine*; column 20, line 23, for "dicyandiamine" read *dicyandiamide*;

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*